US005367162A

United States Patent [19]

Holland et al.

[11] Patent Number: 5,367,162

[45] Date of Patent: Nov. 22, 1994

[54] INTEGRATING TRANSIENT RECORDER APPARATUS FOR TIME ARRAY DETECTION IN TIME-OF-FLIGHT MASS SPECTROMETRY

[75] Inventors: John F. Holland, Lansing; Christie G. Enke, East Lansing; Michael R. Davenport, Lansing, all of Mich.; Lawrence W. Janow, Seattle, Wash.

[73] Assignees: Meridian Instruments, Inc., Okemos; Michigan State University, Board of Trustees Operating Michigan State University, East Lansing, both of Mich.

[21] Appl. No.: 81,731

[22] Filed: Jun. 23, 1993

[51] Int. Cl.[5] ........................ B01D 59/04; H01J 49/00

[52] U.S. Cl. .................................... 250/287; 250/283

[58] Field of Search ........... 250/283, 287, 288, 288 A, 250/282

[56] References Cited

U.S. PATENT DOCUMENTS

| | | | |
|---|---|---|---|
| 4,472,631 | 9/1984 | Enke et al. | 250/287 |
| 4,490,806 | 12/1984 | Enke et al. . | |
| 4,694,168 | 9/1987 | LeBeyec et al. | 250/287 |
| 4,970,390 | 11/1990 | Szymezak | 250/287 |
| 5,175,470 | 12/1992 | Enke et al. | 250/288 A |

OTHER PUBLICATIONS

"Time-of-Flight Mass Spectrometry Technology", Peter H. Burrill, Ph.D. Jan. 1993.

*Primary Examiner*—Bruce C. Anderson

*Attorney, Agent, or Firm*—Harness, Dickey & Pierce

[57] ABSTRACT

An integrating transient recorder for time array detection of ions within an ion source extraction. The arrival times of all ions having various mass-to-charge ratios are calculated and integrating or peak detecting circuitry is activated just prior to the calculated time of arrival of each ion, and then only for a time duration in accordance with a predetermined data collection time window sufficient to enable each ion mass value to be completely measured. An analog-to-digital converter converts the area or peak analog signal for each ion into a corresponding digital signal and outputs the digital signals to a plurality of FIFO buffers. The FIFO buffers are read out for each successive transient by a digital signal processor and summed over a predetermined number of sequential transients in a mass locked registry creating a file of ion intensities versus mass-to-charge ratio of all ions detected. In a preferred embodiment the apparatus includes a mass defect detector which compares the actual arrival time of the ions with the calculated anticipated time of arrival and applies appropriate time delays from a selected one of a plurality of delta-mass tables. This causes the area or peak detection circuity to be turned on either slightly prior to or subsequent to the calculated times of arrival of each of the ions to thus cause each of the ions to be received clearly and completely within each data collection window. Preferred embodiments include combinations of analog or digital peak or area capture and analog or digital successive summations.

31 Claims, 5 Drawing Sheets

INTEGRATING TRANSIENT RECORDER APPARATUS FOR TIME ARRAY DETECTION IN TIME-OF-FLIGHT MASS SPECTROMETRY

BACKGROUND OF THE INVENTION

1. Technical Field

This invention relates generally to transient recorders for time array detection in time of flight mass spectrometry, and more particularly to an integrating transient recorder incorporating methods of operation and apparatus for determining ion intensities only at expected arrival times of ion peaks within one or more transients.

2. Discussion

Since the earlier part of the twentieth century, mass spectrometry has been a vital tool for the analyst and the scientist. This technique utilizes the understanding that neutral molecules can be ionized and, when in a vacuum, the resulting ions can be manipulated by electric and magnetic fields and detected with great sensitivity. The response of an ion to the magnetic and electric fields is dependent on the mass-to-charge ratio of the ion so that the ions of a specific mass-to-charge ratio can be detected and the number of ions at each of many mass-to-charge ratios can be determined.

Mass spectrometers are classified on the basis of the way in which the ions of differing mass-to-charge ratios are distinguished from each other. Magnetic sector mass spectrometers separate ions of equal energy on the basis of their momentum as they are deflected or dispersed in a magnetic field. Quadrupole mass filters isolate ions based on their rate of acceleration in response to a high frequency RF field in the presence of a DC field. Ion cyclotron and ion trap mass spectrometers separate ions based on the frequency or dimensions of their resonant oscillations in AC fields. Potentially the simplest of all mass discriminators, time of flight mass spectrometers, separate ions based on the velocity of ions of equal energy as they travel from an ion source over a fixed dimension to a detector.

In the time of flight mass spectrometer the neutral molecules are ionized in high vacuum in an ion source. Subsequent to ionization, a packet or bundle of ions (i.e., an ion source extraction) is synchronously extracted with a very short voltage pulse. The ions within the ion source extraction are accelerated to a constant energy and they then traverse a field-free region. During this time the ions separate from one another on the basis of their velocity. The difference between the instant of detection for any ions in a source extraction and the instant of their extraction from the source, is exactly timed. From this time of flight information the mass-to-charge ratio of a particular ion can be readily determined if the energy of acceleration and the distance travelled of the ion are known. For a linear field-free time of flight mass spectrometer, the simple relationship $KE=\frac{1}{2}mv^2$ is used to derive equations that will calibrate the mass-to-charge ratio of the ions that are detected. Even in the presence of retarding or reflecting electric or magnetic fields, the times of arrival for all ions can be readily calculated based on knowledge of the mass-to-charge values of only two ions and their exact arrival times at the detector.

Although relatively simple and straightforward in design and concept, the time of flight mass spectrometer has been limited in applications due to the failure to take advantage of the very high rate at which information is generated at the detector. Because ions having different mass-to-charge ratios may be present in each ion source extraction, they will strike the detector at different times depending upon their velocities. The detector output signal is then made up of a sequence of ion arrival responses where the square of the arrival time is related to the mass-to-charge ratios of the detected ions. In order to reduce the effects of the energy variations of the ions and to increase the sensitivity of detection, relatively high accelerating potentials are commonly used (in the range of from 1,000 to 3,000 volts). The speed of the resulting ions, when accelerated by these potential differences, is quite great and, hence, the time between the arrival of ions of sequential mass-to-charge ratios is very short, generally less than one microsecond. Within a few hundred microseconds after initiating the ion source extraction, even the heaviest ions of interest (i.e., ions having the lowest velocities) will have arrived at the detector. Thus, the detector signal comprises a very brief "transient" containing a series of pulses where the individual amplitudes and pulse times correspond to the number and mass-to-charge ratios of the ions within the ion source extraction. The first time of flight instruments utilized exclusively oscilloscopes with variable persistence in order observe the transient signal produced by repetitive ion source extractions. Since this was essentially an empirical method, it required a reasonably constant sample pressure in the ion source during measurement and, even with photographs of the resulting oscilloscope traces, calibration and quantitation of the ions was exceedingly difficult.

An alternate recording method of readout was developed that utilized the concept called time slice detection (TSD). In this concept, a type of boxcar integrator is utilized. A time delay is placed between the time of the extraction pulse which generates the ion source extraction and the gating (i.e., initiating operation) of the detector circuitry. The detector circuitry is typically gated (i.e., "turned on") for a very brief period (2–15 nanoseconds) which represents approximately a portion of the variation in the arrival times for ions of a single mass-to-charge ratio at the detector. Accordingly, a "snap-shot" of the detector activity over a short, specific time interval, after the extraction pulse, is produced. Slowly varying the time delay in the initiating operation of the boxcar integrator over many successive extractions allows a "scan" across all potential ion arrival times. This progressively increasing time delay throughout the region of all of the arrival times of the ions requires from 2 to 10 seconds to produce the desired mass-to-charge versus the relative ion abundance across the mass-to-charge range of 2 to 800. Typically, the detected information is fed to an analog recorder where a permanent record of ion abundance (i.e., ion quantity) versus time (i.e., mass-to-charge) is obtained. Since the inception of time of flight mass spectrometry, measurements of the oscilloscope trace and/or time slice detector devices have dominated the read-out mechanisms.

A variation of time slice detection allows the ion peak measuring system to be activated by the event itself (i.e., an ion or ions striking the detector). This form of detection is generally known in the art as time-to-digital conversion. In this method of data collection, a counter associated with each arrival time window is incremented when an ion arrives within that window with the assumption that no more than one ion is involved for each window. This approach is employed in situations where very little amounts of sample are used and the measurements are made over long periods of time employing ionization methods designed to produce only a single ion most of the time. Multiple time storage actions can be accomplished during a single transient enabling several single ion events to be recorded for each transient.

Several approaches have been employed to improve the efficiency of the data collection processes for time of flight mass spectrometers. These include the use of more than one box car integrator, with each being triggered to the extraction pulse and each integrating the ion current over a separate time "slice". In this manner, up to eight or more individually measured points may be made subsequent to each ion source extraction. These points may be fixed in their delay time corresponding to ions having specific, predetermined mass-to-charge ratios. In this manner, a technique called selected ion monitoring (SIM) is realized whereby the collection process for a small number of ions of varying mass-to-charge ratios is made quite efficient. This mode, however, only works in situations where the sample constituency is either known or anticipated so that full spectral information may be sacrificed.

Time slice detection has two serious drawbacks: it is relatively slow in the generation of the scans and only a fraction of the data or information striking the detector is saved and utilized. Thousands of source extraction pulses may be required to acquire the information that is inherent in each detector output transient. Two major advantages of time of flight mass spectrometry, its rapid generation of spectral information and its high efficiency of ion utilization, are thus obviated by time slice detection. As a consequence, various devices have been developed for Time Array Detection (TAD) in which all of the information in an individual transient may be captured and stored. These devices are called transient recorders or digital transient recorders.

With transient recorders or digital transient recorders, a bank of high speed registers is filled sequentially in time with the information from the detector during the course of a single transient. The time access is dependent upon the digitizing rate of a dedicated analog-to-digital converter (ADC) and is usually in the 100 MHZ to 1 GHz range. The information from multiple transients may be continuously summed in a high speed summing memory register bank in a time locked mode for a preset number of transients, at the end of which time the register bank will contain information sufficient for the production of a single mass spectrum. These approaches have been used in many successful applications where the sample introduction has been static. Their major drawback is that once the memory bank has been filled, data collection must be suspended while the data are transferred to other memory or to a computing device. Indeed, in several devices, data collection is continuously interrupted by the summing within the storage memory itself. These processes limit the rate at which new transients can be accepted. With all known devices, this rate limitation results in the use of only a small fraction of the potentially available sample data. These gaps in the collection process make this approach totally unusable for applications such as chromatography where the continuity of the time axis must be maintained. However, time array detection has found widespread utility in situations where ions can be created in time dependent or time controlled modes, such as by laser ionization, with a low repetition rate pulsed laser.

For chromatographic and other time dependent applications, a far more efficient approach involves the use of a device called an integrating transient recorder (ITR). This device is capable of digitizing data at a rate sufficient to capture all of the information (i.e., the complete ion source extraction) from each and every extraction of a high repetition rate ion source. Subsequent transients are summed in a locked time registry in one of two memory banks until a summation or integration period is reached. This summation process yields several benefits. It is a linear summation (i.e., unweighted) and hence the sum file itself can be used as a single file of ion intensity versus time which is transformed to ion intensity versus mass-to-charge ratio, and is stored as a mass axis scan file, commonly referred to simply as a spectrum. These data accurately represent the ion population existing in the source over the integration time. Since the moment of extraction is the same for all ions having various mass-to-charge ratios, there is no skewing of the relative ion intensities as a function of the mass-to-charge ratio which in other types of mass spectrometers is caused by changes in sample concentration in the ion source during the time required to scan through the desired range of mass-to-charge ratios. Additionally, sequential summation increases both the signal-to-noise ratio and the ultimate sensitivity of the measurements. Finally, the summation process itself acts as a time shift mechanism allowing the information within the transient to be collected at a very high frequency and the resulting summed transient spectrum files to be transferred, processed and stored utilizing the electronic circuitry and bus structure of a typical high speed computer system. The integrating transient recorder described above is the subject of U.S. Pat. No. 4,490,806, issued Dec. 25, 1984, and was the first device of its kind to enable continuous time array detection in time of flight mass spectrometry. The disclosure of U.S. Pat. No. 4,490,806 is hereby incorporated by reference just as if same were fully set forth herein.

The presently preferred implementation of the integrating transient recorder described above makes use of a 200 megasamples per second, 8-bit flash analog-to-digital converter. The synchronized A/D converter output data is stored in two banks of high-speed emitter-coupled logic memory (ECL). Successive transients are summed in a locked registry in one bank while the other bank is simultaneously being read out into the data bus for subsequent processing and storage. After a desired operator-selectable number of transients have been summed in one bank, the spectrum file information in it is read out while the other bank, which has been cleared, is now used to collect the incoming data. Thus, data collection is continuous over an indefinitely long time. This technique allows all of the information in every transient to be used in the creation of subsequent spectra. Additionally, since only 10 transients need to be summed in the typical time of flight mass spectrometer (10,000 extractions per second) in order to reach levels that can be processed by other than high speed ECL logic, the integrating transient recorder described above is capable of creating and processing up to 1,000 spectrum files per second. In typical operation, approximately only 20–25 spectra per second are adequate to follow the temporal variations in the analyte composition of the transients.

While the above described integrating transient recorder has proved to be a significant success, the recorder itself is physically large and its ECL logic consumes a fair amount of power which necessitates a built-in air conditioner. It is very complex, somewhat expensive to build, and quite sophisticated in its operation.

Accordingly, it is a principal object of the present invention to provide an integrating transient recorder apparatus and method for time array detection in time of flight mass spectrometry, for continuously and without interruption acquiring, collecting and processing the information present in an ion extraction source, where all of the ion source extraction is captured and utilized in the generation of spectra with considerably less complicated and less expensive physical components than heretofore accomplished. More specifically, it is a principal object to accomplish detection of each ion peak within a transient by generating information only at the precise times at which ion peaks within a transient are expected to be arriving at a detector, to thereby greatly reduce the amount of information utilized from the detector while still detecting every ion peak present in the transient.

It is another object of the present invention to provide an integrating transient recorder apparatus and method for time array detection in time of flight mass spectrometry in which the apparatus incorporates means for forming a plurality of delta-mass tables which each include a plurality of predetermined time delays corresponding to the varying mass-to-charge ratios of ions within the ion source extraction, which predetermined time delays are controllably applied to initiate operation of integrating and/or peak detection circuitry at the expected arrival times of ions within the ion source extraction, and further only for a predetermined time duration.

It is yet another object of the present invention to provide an integrating transient recorder apparatus and method which compensates for mass defects in the masses of ions within said ion source extraction such that operation of an integrator or peak detection circuit of said apparatus is initiated in accordance with a modified time delay to thereby compensate for the variance in the anticipated arrival time of the ions introduced by the mass defect.

It is yet another object of the present invention to provide an integrating transient recorder apparatus which includes a first integrator or peak detector circuit responsive to ion peaks within a transient where the ions have only odd numbered mass-to-charge ratios, and a second integrator or peak capture circuit which is responsive only to ions having an even mass-to-charge ratio, and where each of the first and second circuits includes independent analog-to-digital converters, independent buffers, and independent digital signal processors.

It is yet another object of the present invention to provide an integrating transient recorder apparatus having a plurality of integrators responsive to a transient generated by an ion source extraction pulse, where operation of each of the integrators is turned on only at predetermined times of arrival of a limited number of ion peaks within the transient, and further where the operation of the integrators is initiated sequentially, one at a time, by a multiplexer control circuit.

It is yet another object of the present invention to provide an integrating transient recorder which is not only capable of determining ion intensity, but also determining the time of arrival of ions at a detector after applying a source extraction pulse.

It is still another object of the present invention to provide a new analog-to-digital converter for use with the integrating transient recorder apparatus thereof which expands the range of measurement capability of an otherwise conventional 8 bit analog-to-digital converter, automatically, depending on the magnitudes of the ion peaks of each incoming transient.

SUMMARY OF THE INVENTION

The above and other objects are provided by an integrating transient recorder apparatus and method for time array detection in time of flight mass spectrometry in accordance with preferred embodiments of the present invention.

The apparatus generally includes detector means for detecting the arrival of ions within an ion source extraction and generating an output signal indicative of the intensity of the ions and means for turning on a signal capture circuit only at the precise time at which each individual m/z in packet in the transient has been calculated to arrive at the detector means, and maintaining the capture means turned on only for a predetermined time window sufficient in duration to separately capture each and every m/z ion peak in an entire transient. In this manner the detector means generates information which is used only at the precise times that ion peaks are arriving thereat. This significantly reduces the amount of data generated by the detector means which needs to be stored and processed, while still completely capturing the spectral information of every ion with the transient.

In a preferred embodiment, the apparatus includes mass defect detector means for monitoring the actual times of arrival of the ions at the detector means and for modifying the start time of the capture means to cause the capture means to be turned on either slightly prior to or after the calculated arrival time of each ion within the transient. In this manner the shift in the arrival times of the ions caused by mass defects in the ions can be compensated for.

In the preferred embodiment the apparatus of the present invention includes analog-to-digital converter means which generates digital signals representative of the output of the detector means, first and second input FIFO (First-In-First-Out) buffer register for storing the digital signals output from the analog-to-digital converter means; and digital signal processing means for alternately reading out and processing the contents of each of the first and second input FIFO buffers in a mass-to-charge locked registry. The apparatus operates such that while the first input FIFO buffer is being loaded with digital information during one transient the second input FIFO buffer is being read out, and while the second input FIFO buffer is being loaded during a subsequent transient the first input FIFO buffer is read out. The digital signal processing means generates a plurality of spectrum files representative of ion intensities of all ions within a contiguous sequence of transients. In the preferred embodiment an optional output FIFO buffer is also included for temporarily storing each of the plurality of spectrum files such that same may be read out over an input/output bus to a computer.

In an alternative preferred embodiment of the present invention an integrating transient recorder apparatus is disclosed which incorporates independent first and second integrator and/or peak capture circuits each having their own associated analog-to-digital converters, means for turning on each of the capture circuits only at times at which ions are calculated to arrive at the capture circuit means, input FIFO buffers and digital signal processors. The first capture circuits are further turned on only at the precise times to detect ions within the transient having odd numbered mass-to-charge ratios. The second capture circuit is further turned on only at times to detect ions within the ion source extraction having even numbered mass-to-charge ratios. Each of the capture circuits is further turned on only for a predetermined time window sufficient to enable the entire ion peak to be detected. In this embodiment an optional scan FIFO buffer may also be coupled to outputs of the digital signal processors for alternately reading the contents of each, storing the contents of both as a plurality of spectrum files therein, and outputting the spectrum files over an input/output bus to a computer.

In yet another alternative preferred embodiment of the present invention an integrating transient recorder apparatus is disclosed for performing ion peak integration in the digital domain. This embodiment incorporates a tracking analog-to-digital converter which digitizes analog ion peak information by the use of a digital up/down counter clocked at a frequency in the GHz range and a digital-to-analog (D/A) converter responsive to the output of the digital up/down counter.

In still another alternative preferred embodiment of the present invention, an integrating transient recorder apparatus is disclosed which incorporates a very high speed flash analog-to-digital converter circuit to enable integration (summation) of each m/z peak in the digital domain. This embodiment includes an analog-to-digital converter which generates a digital representation of the incoming ion source extraction signal. An output of the analog-to-digital converter is applied to a first input of a digital summer. An output of the digital summer is then applied to a second input of the digital summer. In this manner digital integration of ion peaks having predetermined mass-to-charge ratios is accomplished in the digital domain, the resulting sums being then applied to a FIFO buffer for subsequent processing.

In still another alternative embodiment of the present invention an integrating transient recorder apparatus is disclosed which sums ions from successive transients having similar mass-to-charge ratios in the analog domain. With this embodiment each one of a plurality of integrators are made operational in sequential fashion, and only after predetermined time delays corresponding to the expected times of arrival of ions having predetermined mass-to-charge ratios.

In still another preferred embodiment of the present invention, an integrating transient recorder apparatus is disclosed in which the presence of a peak of an ion signal within a transient is detected by a threshold detector. With this embodiment, capture of ion intensity is initiated without the use of any predetermined time delays. Instead, capture is initiated when a peak of an incoming ion packet is detected by the threshold detector circuit. In this embodiment, the times of arrival of all m/z ion packets above threshold are also measured. This embodiment further includes a differentially driven zero crossing detector circuit for detecting exactly when the center of the peak ion signal occurs.

In yet another alternative preferred embodiment the apparatus includes circuit means for multiplexing both the analog input and the digital output of an analog-to-digital converter such that the range of measurement of the analog-to-digital converter is automatically increased or decreased depending on the magnitude of each ion peak signal being detected. The range of measurement control is accomplished in part by selectively gating the input of the analog-to-digital converter to one of a variety of fixed gain analog circuits by means of a multiplexer circuit having an address register controlled by intensity signal level comparators. This same address register controls a gating circuit that directs the digital output of the A/D converter in a manner that increases the range (i.e., length of output word) without altering the precision of (i.e., significant bits) in the output word. Accordingly, this dynamic range expansion by dual multiplexing functions is accomplished without any software overhead and without any loss of timing.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENT

Figure 1:
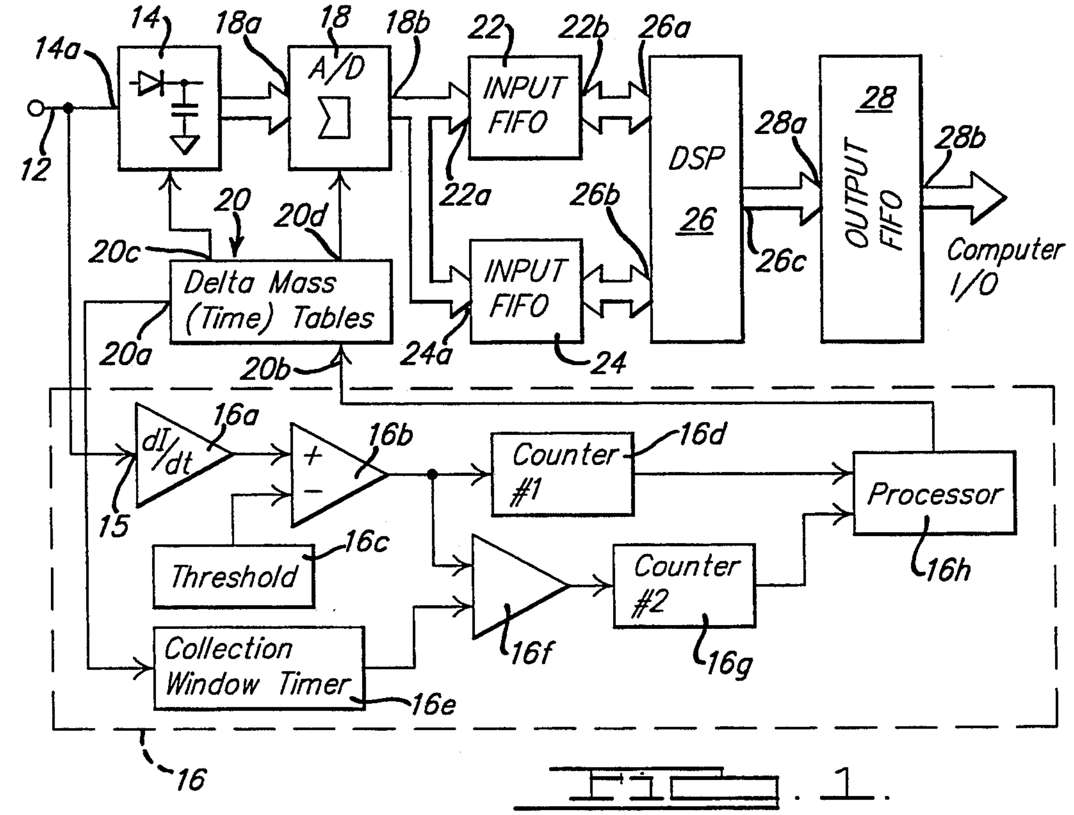
FIG. 1 is a block diagram of an integrating transient recorder apparatus in accordance with a preferred embodiment of the present invention.

Referring to FIG. 1, there is shown an integrating transient recorder apparatus 10 for time array detection in time of flight mass spectrometry. The apparatus 10 generally includes an input 12 which is coupled to an input 14*a* of a capture circuit 14 and an input 15 of a mass defect detector circuit 16. An output 14*b* of the capture circuit 14 is coupled to an input 18*a* of an analog-to-digital converter 18. A memory device 20 containing a plurality of delta-mass tables (referred to hereafter simply as the "delta-mass tables 20") is coupled communication with the mass defect detector 16 via an output 20*a* and an input 20*b*, and further between the differentiator circuit 16 and the analog-to-digital converter (hereinafter "A/D converter") 18 via outputs 20*c* and 20*d*, respectively.

An output of the analog-to-digital converter 18*b* is coupled to an input 22*a* of a first input FIFO buffer 22 and an input 24*a* to a second input FIFO buffer 24. Each of the buffers 22 and 24 include an output 22*b* and 24*b*, respectively, which are coupled to inputs 26*a* and 26*b*, respectively, of a digital signal processor 26. An output of the digital signal processor 26*c* is in turn coupled to an input 28*a* of an output FIFO buffer 28. An output 28*b* of the output FIFO buffer 28 is coupled to an external computer through a conventional input/output bus.

The capture circuit 14, as will be described more fully momentarily, represents circuitry which may either integrate each incoming ion signal within an ion source extraction (hereinafter referred to as a "transient") or, alternatively, may comprise peak detection circuitry for detecting the peak of each ion signal within the transient.

With the apparatus 10 of the present invention, it is a principal advantage that operation of the capture circuit 14 is not initiated until the calculated time of arrival of each ion, and then only for a user predetermined (but variable) data collection time window. This is accomplished by use of the delta-mass tables 20. The delta-mass tables 20 include a plurality of predetermined time delays corresponding to the expected (i.e., calculated) times of arrival of each and every ion peak within a transient having a specific mass-to-charge ratio. In time of flight analysis, the exact determination of arrival time for all masses requires only the exact flight times for two ions having known mass-to-charge ratios. A formula which may be used for determining the arrival time of all masses (and 25 thus every ion within a transient) may be represented as follows:

$$t_{measure} = t_{offset} + K\sqrt{M/z}$$

where $t_{measure}$ equals the time of arrival for an ion having a predetermined mass-to-charge ratio, where $t_{offset}$ equals the increment between when an ion source extraction pulse is generated and when the actual ion extraction occurs. K equals a constant representing the time domain introduced by dimension of the measurement equipment and the nature and strengths of the electric fields applied, and where m/z equals the mass-to-charge ratio of the ion.

Prior to any analysis, the apparatus 10 is precalibrated. This may involve use of an accurate time base oscilloscope to determine the time offset ($t_{offset}$) and slope (K) constants for a given set of instrumental parameters by the application of the above equation to two known m/z's. The determined constants are valid for all data collected under operating conditions where the instrumental parameters remain unchanged. On the basis of the above equation, the arrival times of all ions having sequential mass-to-charge ratios throughout the spectrum being analyzed can be calculated.

These calculated arrival times are offset by an amount equal to one-half of the time of the predetermined data collection time window during which the capture circuit 14 is activated so that the peak of each ion will fall approximately in the center of its associated data collection time window. The difference between the offset peak arrival times for ions having successive mass-to-charge ratios are then calculated and used to create a plurality of predetermined time delays which form the delta-mass tables 20. Thus, the second time delay applied will represent the time increment from the beginning of the data collection window during detection of the first group of incoming isomass ions to the time at which the capture circuit 14 is again turned on to detect the next group of incoming isomass ions, and so forth for each successive ion peak within a transient. The time delay values in the delta-mass tables 20 are accurate to the nearest two nanoseconds.

The data collection time window mentioned above represents a user settable time interval, preferably within a range of about 40–70 nanoseconds, during which the capture circuit 14 is turned on. By offsetting the calculated arrival times of ions by an amount equal to preferably one-half of the data collection window time interval, the full magnitude of each ion signal can be captured by the capture circuit 14.

By determining the precise time of arrival for each ion within the transient, and only turning on the capture circuit 14 at the precise time of arrival for each ion the full spectrum of mass intensity information can be obtained while enabling the capture circuit 14 to generate significantly less data than would otherwise be generated if the capture circuit 14 were active during the times that no ions were arriving at the capture circuit 14. By this manner of data acquisition, which has been termed by the inventors as "mass mapped acquisition", typically only about 500 data points (i.e., points at which an ion peak is expected) over a transient need to be taken rather than typically about 20,000 data points taken by prior systems that sample the transient at a large plurality of evenly spaced data points (e.g., every 5 ns), in an effort to detect every ion peak in the transient. Thus, the mass mapped acquisition system described herein typically reduces the number of data conversions required by the A/D converter 18, and thus the amount of data generated, by one or two orders of magnitude. This, in turn, allows considerably less expensive and less powerful processing and storage hardware to be used without sacrificing performance and resolution of the mass spectrum analysis.

With further regard to FIG. 1, the mass defect detector 16 will be discussed. Initially, it should be understood that the mass defect detector 16 corrects for the "shift" in actual ion arrival times caused by the mass defect of molecules being measured by applying compensation factors to the calculated time values stored in the delta-mass tables 20. The mass defects, as will be understood by those of ordinary skill in the art, arise from deviations from integer values in the atomic masses of various elements. For example, carbon has been assigned an atomic mass of 12.000. All other atomic masses are related to the mass of this element; they are nearly integer values, but not exactly. For example, the mass of hydrogen is 1.005 and oxygen is 15.997. These deviations from integer values are known as "mass defects". Mass defects can be positive (i.e., greater than the integers) such as for hydrogen or a negative (less than the integer value) such as for oxygen. Small molecules present little problem in the determination of exact arrival times of ions having varying masses. For larger molecules, however, the cumulative summation of mass defects may interfere greatly with the accurate determination of exact arrival times of ions within the ion source extraction. When all of the atoms within a heavier organic molecule are summed, the difference between the actual mass and the calculated mass using the integer values are called the "molecular mass defect".

The correction applied by the mass defect detector 16 is based on two assumptions: 1) different ion fragments resulting from the same molecule will have similar mass defects, and 2) the molecules can be assigned in their mass defect to one of at least four classes The four classes are "normal" "slightly positive", "moderately positive" and "slightly negative". This creates four classifications for which determinations can be made to yield four independent delta-mass tables, which are referred to collectively by reference numeral 20 in FIG. 1. Since the objective of high-speed, medium resolution mass spectrometry has traditionally been nominal mass accuracy, the use of the appropriate table results in mass assignments sufficiently accurate to accomplish the objective of correcting for deviations from the calculated arrival times for all ions. In this manner, the mass defect detector 16 insures that the capture circuit is turned on at precisely the proper times so that every ion peak will fall at the approximate midpoint of the data collection window. It will be appreciated by those skilled in the art, however, that there is no limit to the number of delta-mass tables that may be employed if more than four are desired. In practice, the number of tables used will depend on the size of the data collection window and the resolution needed.

The mass defect detector 16 (FIG. 1) of the present invention includes a differentiator **16*a*, a comparator 16*b*, a threshold signal source 16*c*, a first counter 16*d*, a data collection window timer 16*e*, an edge timing comparator 16*f*, a second counter 16*g*, and a processor 16*h*. The data collection window timer 16*e* receives a signal from the delta-mass table 20, which has been selected by an output of the processor 16*h***.

With further reference to FIG. 1, a description of the overall operation of the apparatus 10 will now be provided. Initially, an ion source extraction pulse is applied to generate an ion source extraction which will subsequently generate a transient waveform at the ion detector which is fed to the capture circuit 14. At the instant the ion source extraction pulse is applied, the delta mass table in concert with the master clock will cause an initial time delay which corresponds to the calculated arrival time of the lightest of the ions of interest to be applied before turning on the capture circuit 14 for the first group of incoming isomass ions. The capture circuit 14 acts to determine either the summed total intensity of ions having the first predetermined mass-to-charge ratio, or alternatively, the peak ion signal of all ions having the first predetermined mass-to-charge ratio.

The capture circuit 14 is turned on just prior to the arrival of the lightest ions of interest for the predetermined data collection time window which, as described above, is preferably in the range of about 40–70 nanoseconds. More specifically, the capture circuit 14 is turned on before the calculated arrival time of ions having the first predetermined mass-to-charge ratio by about 20–35 nanoseconds (i.e., approximately ½ the total time of the data collection window) so that the incoming ion peaks will each be approximately centered within their data collection time windows.

During the time that the capture circuit 14 is turned on, the differentiator **16*a* of the mass defect detector 16 simultaneously receives the arriving signal and differentiates this signal to produce signals representative of the slopes of the ion peaks thereof. The differentiated signals are output to the comparator 16*b* which compares the rising edge of the differentiated signals against a threshold signal from the threshold signal source 16*c*. Whenever the differentiated signal exceeds the threshold signal the comparator 16*b* generates an output signal to the first counter 16*d* and to the edge timing comparator 16*f*. The first counter thus contains a count of the number of ion peaks whose derivative is above the predetermined threshold signal from the threshold signal source 16*c***.

The differentiated signals from the comparator **16*b* are simultaneously received by the edge timing comparator 16*f* and compared against a signal from the data collection window timer 16*e*. The signal from window timer 16*e* is generated after the first half of the data collection time window has expired. An output from the edge timing comparator 16*f* is generated each time an ion peak arrives during the second half of the data collection time window. The output of the comparator 16*f* is input to the counter 16*g*, which accumulates, in real time, a running count of the total number of ion peaks arriving during the second half of the time window throughout a designated portion of the transient waveform. If the processor 16*h*** determines that an overwhelming majority of ion peaks are occurring in the second half of the time collection windows, then for the next transient it will cause a delta-mass table to be employed that will contain increased time delays between the successive data collection windows, to thereby "shift" the data collection windows such that each window is approximately centered over each of the incoming ion peaks. Conversely, if the majority of ion peaks are determined to be occurring in the first halves of the data collection windows, then a delta-mass table with shortened time delays between successive data collection time windows will be used for the next transient. This will cause the data collection windows to be shifted such that each occurs slightly prior to the previously calculated arrival times for the ion peaks. In this manner, by keeping the calculated times of arrival congruent with the actual times of arrival the full magnitude of each of the ion peaks is always obtained.

In each data collection window that has been opened, the capture circuit 14 generates an analog signal at its output **14*b* which represents the intensity of ions within the transient which have the predetermined mass-to-charge ratio for that window. This output is transmitted to the input 18*a* of the A/D converter 18. The A/D converter 18** is preferably an 8-bit A/D converter although it will be appreciated that A/D converters providing either greater or lesser resolution may be used depending upon the requirements of a specific application.

The output **18*b* of the A/D converter 18 is a series of successive 8-bit digital signals (i.e., "words") each of which is representative of the ion intensity of an ion peak captured by the capture circuit 14. This 8-bit number is transmitted either to input 22***a* or input 24*a* of the first or second input FIFO buffers 22 and 24, respectively. The input FIFO buffers 22 and 24 subsequently store the digital information from the A/D converter 18 for alternate, complete transients. Each buffer 22 and 24 operates as a first-in-first-out buffer and each is addressed (i.e., read out) by the digital signal processor 26 in alternate fashion on alternate transients. Accordingly, while the information from a complete transient in first input FIFO buffer 22 is being read out the second input FIFO buffer 24 will be filled with data from the next transient. Subsequently, the second input FIFO buffer 24 will be read out by the digital signal processor 26 while the first input FIFO buffer 22 begins filling with data from the next successive transient. In this manner there is no interruption in the data collection processes caused by the digital signal processor 26 on the information output from the A/D converter 18 and processing throughput is maximized.

As the digital signal processor 26 reads out the input FIFO buffer 22 or 24, the information stored in either buffer is processed in real time by the digital signal processor 26 to sum the integrated or peak ion signals of ions within successive transients having the same mass-to-charge ratios in a m/z locked registry therein. Summation of the ion intensities of all of the m/z values in successive transients over a user-determined number of transients produces a file representative of a single mass spectrum. Repetition of the summation processes creates successive spectra, contiguous in time and continuous in operation, without interruption or loss of information. Accordingly, the apparatus 10 enables time array detection techniques to be employed in time of flight mass spectrometry with maximum utility for continuously varying samples.

Figure 2:
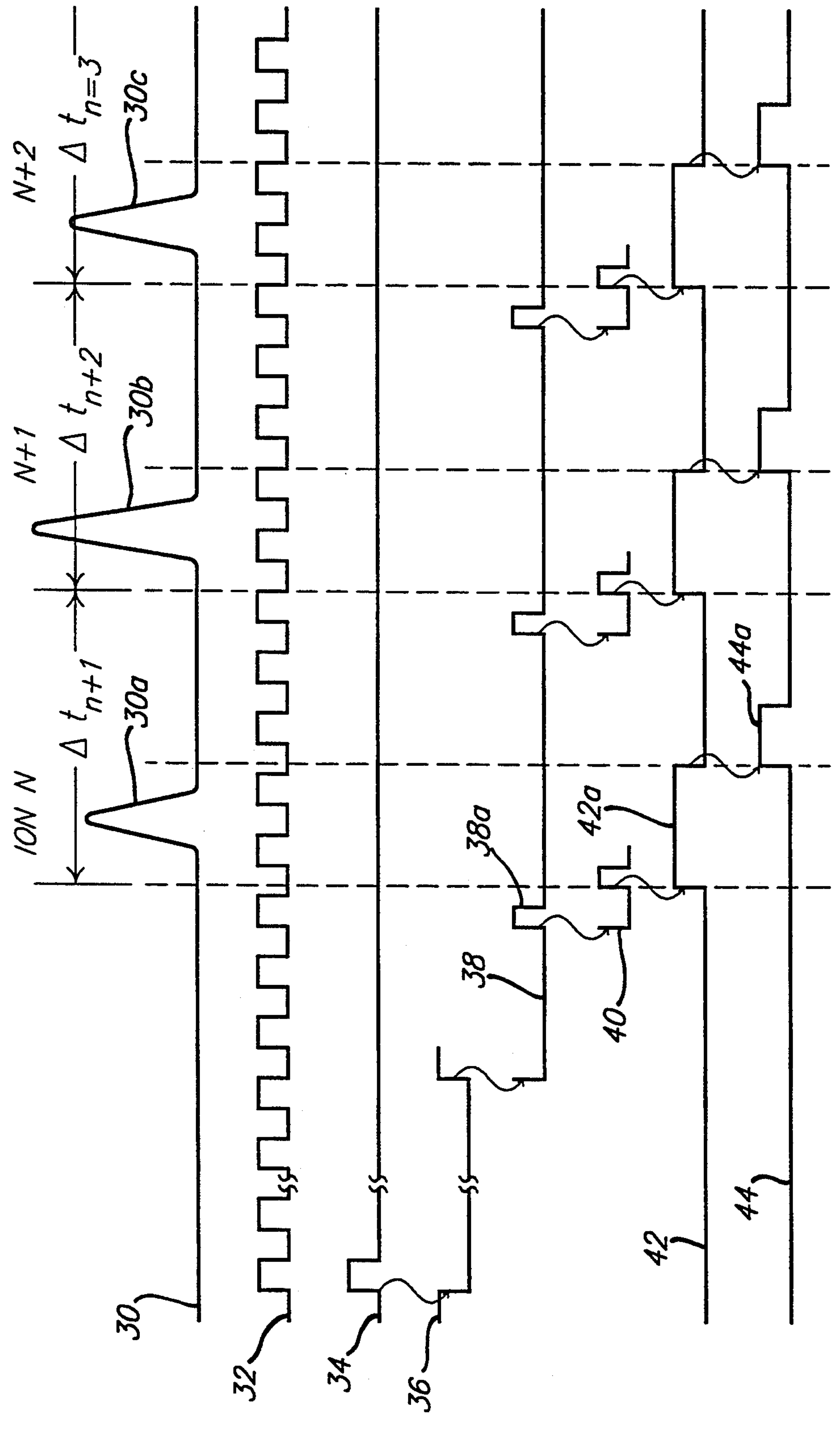
FIG. 2 is a timing diagram of the operation of the apparatus of FIG. 1.

Referring to FIG. 2, a timing diagram is shown illustrating the relationship between numerous waveforms during detection within a particular transient. The transient is represented by waveform 30 having a first ion peak 30*a*, a second ion peak 30*b* and a third ion peak 30*c*. Also illustrated in relation thereto is a master clock pulse train 32, an extraction pulse 34, a waveform indicating the pre-time period 36, a "coarse" time waveform 38, a "fine" time waveform 40, a waveform 42 indicating the data collection time window, and a waveform 44 indicating the on-time of the A/D converter 18 (FIG. 1).

At the time an ion source extraction pulse 34 is applied, the pre-time delay is applied which corresponds to the initial time delay between the time when the extraction pulse is first applied and when the first (i.e., lightest) ions of interest reach the detector. At the end of the pre-time period, for which there will be only one for each ion source extraction, a divide down clock generates a "course" pulse 38*a* which, in turn, is used to synchronize operation of a "fine" divide down clock. The fine divide down clock generates an extremely reproducible (from 1 ns–20 ns) clock signal which is used to trigger a one-shot multivibrator, which in turn is used to cause the capture circuit 14 to become operational. The capture circuit 14 is turned on for the time interval 42*a*, which represents the first data collection time window. Upon expiration of the time interval 42*a*, the A/D converter 18 is turned on, as indicated by time interval 44*a*. From FIG. 2 it should be appreciated that the data collection time window is implemented such that the first incoming ion peak 30*a* will fall approximately in its center (i.e., at its midpoint).

Figure 3:
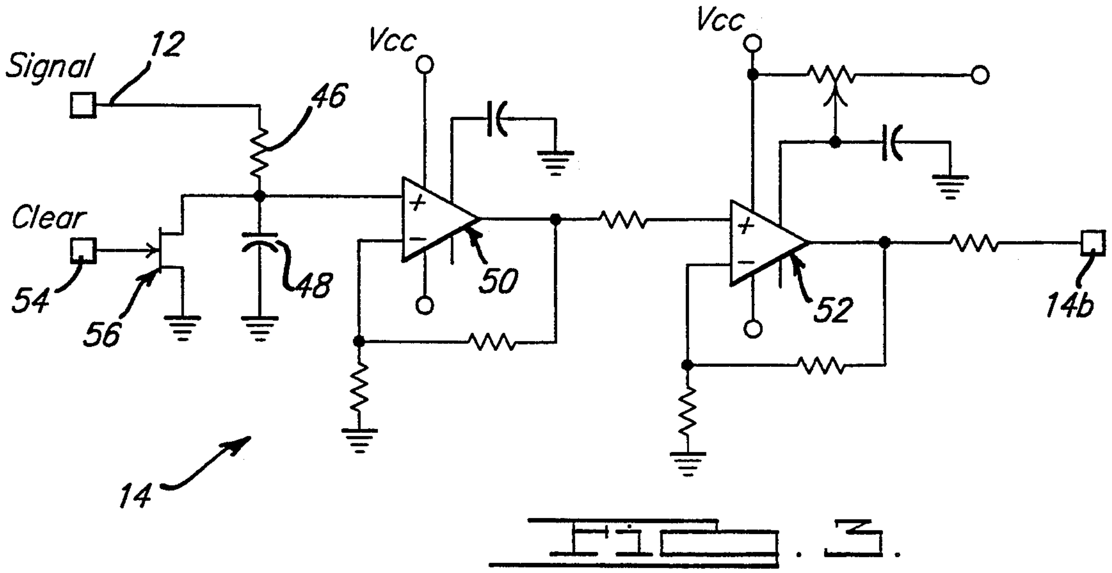
FIG. 3 is a schematic diagram of the capture circuitry of the present invention.

Referring now to FIG. 3, a preferred implementation of the capture circuit 14 is shown in greater detail. The circuit 14 generally includes an input resistor 46, an input capacitor 48, a first amplifier stage 50 and a second amplifier stage 52. A clear input 54 is also provided for enabling the input capacitor 48 to be discharged through a MOSFET 56. In operation, the capture circuit 14 is initiated after each expiration of a predetermined time delay controlled by the contents of the delta-mass table being used. The capture circuit 14 remains active throughout the data collection window time period. During this time, the input resistor 46 and input capacitor 48 act as an integrator, thus integrating the ion signal of the transient. The integrated signal is then amplified by the first amplifier stage 50 and the second amplifier stage 52, and captured to accommodate the width of the data collection window in order to provide stable signal levels appropriate for the A/D converter 18 (FIG. 1). A stable, integrated signal is provided at the output 14*b* for subsequent input to the A/D converter 18. After the data collection time window is closed, the A/D conversion is initiated. At the conclusion of the conversion, the input capacitor 48 is cleared by a signal applied to the clear input 54, which turns on the MOSFET 56, thus allowing the input capacitor 48 to discharge through the MOSFET 56 to ground.

Figure 4A:
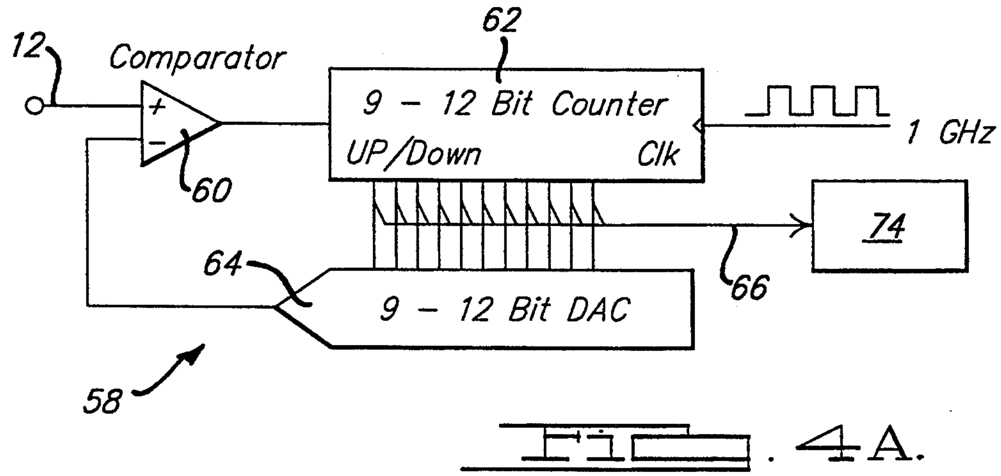
FIG. 4A is a block diagram of a tracking digital-to-analog converter which may be used with the embodiments of FIGS. 1 and 3 to provide integration of ion peak intensities through digital means.

With reference now to FIG. 4A, an alternative embodiment 58 of the A/D converter circuit 18 is shown for measuring the magnitude of the integrated or peak ion current in a manner minimizing the effect of noise on the analog signal. This device may replace the flash A/D converter in the embodiments described above or, as shown in FIG. 4A, may be employed in a scheme enabling ion peak integration to be performed in the digital domain as an alternative to the analog integration of the embodiments described herein.

Circuit 58 includes a comparator 60, a digital up/-down counter 62 and a digital-to-analog (D/A) converter 64. The digital counter 62 is clocked at a very high frequency, preferably at about one GHz. The comparator 60 receives the incoming ion signals on its non-inverting input and outputs a digital signal, for example, a logic high level signal, whenever the transient exceeds the signal applied back to the inverting input of the comparator 60. As the digital counter 62 is clocked, a count is generated therein. The count is output as a digital signal to the digital-to-analog converter 64 which converts the digital signal into a representative analog signal which is applied to the inverting input of the comparator 60. As the magnitudes of the ion peaks applied to the non-inverting input of the comparator 60 increase and decrease, the circuit 58 "tracks" the ion peaks of the transient. Accordingly, the digital signal in the counter 62 is incremented or decremented depending upon the changing magnitude of the ion intensity signal. The digital signal in counter 62 is also fed via an output 66 to a limited size, high speed digital summing register, such as a digital summing register 74, shown in more detail in FIG. 4B and discussed in more detail momentarily. Accordingly, the integration of the ion peak currents may be performed in digital fashion.

If incrementing only is allowed to be performed by counter 2 within a single data collection window, the resulting count in the counter 62 after a single ion peak of the transient has passed will be a digital representation of the peak ion intensity which is output to the input FIFO buffers 22, 24 shown in FIG. 1. Thus, peak detection of the incoming ion peaks is performed digitally, in real time, as opposed to by analog techniques.

Figure 4B:
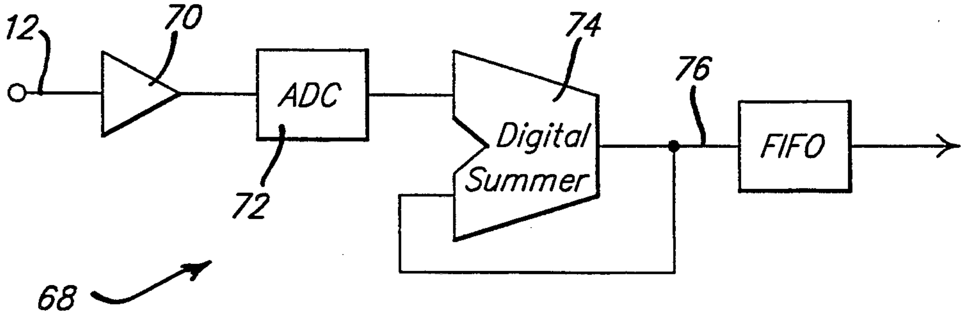
FIG. 4B is a block diagram of a flash analog-to-digital converter and summing circuit for integrating ion peak intensities through digital means.

Referring now to FIG. 4B, yet another circuit 68 is shown in accordance with another alternative embodiment of the capture circuit 14 which performs integration of the ion intensities in the digital domain rather than the analog domain. Circuit 68 includes an amplifier 70, a high speed flash analog-to-digital (A/D) converter 72 and a limited size high speed digital summer 74. The transient is received at the input 12 before being amplified by the amplifier 70. The high speed flash A/D converter 72 generates a digital representation of each of the instantaneous ion currents within the transient which is being detected. This digital signal is transmitted to the digital summer 74. The digital summer 74, in turn, sums the successive digital signals generated by the high speed A/D converter 72 within the confines of each data collection window. The digital summer circuits may be directed to output either the sum (integration) or maximum (peak current) digital signal subsequent to the end of each data collection window. Thus, with either of the embodiments of FIGS. 4A and 4B, integration of peak intensities can be accomplished in the digital domain by immediately converting the incoming analog ion signals into representative digital signals. The output signal of each of the circuits 58 and 68 represents a single maximum value indicative of either the peak ion intensity or the integrated ion intensity for each group of ions having the same mass-to-charge ratio.

Figure 5:
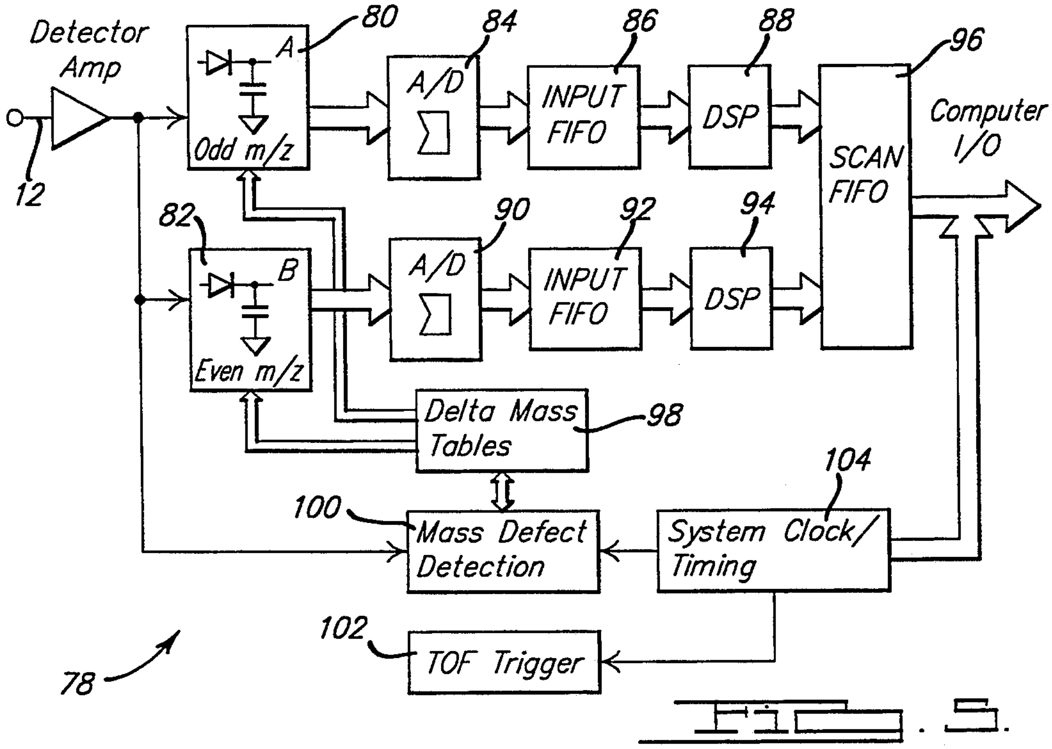
FIG. 5 is a block diagram of an integrating transient recorder apparatus in accordance with an alternative preferred embodiment of the present invention showing the modularity of the present invention by use of a pair of capture circuits each including their own analog-to-digital converters, their own input FIFO buffers, and their own digital signal processors.

Referring now to FIG. 5, an apparatus 78 in accordance with an alternative preferred embodiment of the present invention is shown. The apparatus 78 is similar to the apparatus 10 of FIG. 1, with the principal exception of a dual approach involving two independently controlled capture circuits 80 and 82. Capture circuit 80 is controlled so as to become operational only upon the arrival of ions having odd numbered mass-to-charge ratios. Capture circuit 82, however, is controlled to become operational only during the arrival of ions having even numbered mass-to-charge ratios. Capture circuit 80 includes its own A/D converter 84, its own input FIFO buffer 86 and its own digital signal processor 88. Accordingly, all of the information processing of the information generated by the capture circuit 80 is controlled without regard to the arrival of ions having even numbered mass-to-charge ratios.

In a similar manner, the capture circuit 82 includes its own A/D converter 90, its own input FIFO buffer 92 and its own digital signal processor 94. Thus, processing of the information from the capture circuit 82 takes place independently of the arrival of ions having odd numbered mass-to-charge ratios. Each of the digital signal processors 88 and 94 transmit their output to a scan file FIFO output buffer 96 which subsequently outputs same to an external computer which merges the files into a complete spectrum file. Alternately, a third digital signal processor may be incorporated into this embodiment to merge the two files into single complete spectrum file prior to transfer to an attending computer system for processing and output. The processing of information from each of the capture circuits 80 and 82 by their corresponding components is identical to that described in connection with FIG. 1.

With further reference to FIG. 5, the apparatus 78 includes memory means for storing a plurality of delta-mass tables 98, mass defect detection circuitry 100, a time of flight trigger 102, and a system clock/timing circuit 104. The delta-mass tables 98 and mass defect detection circuitry 100 are identical to the delta-mass tables 20 and mass defect detector 16 of the apparatus 10 of FIG. 1. The time of flight trigger 102 preferably comprises a conventional trigger circuit for initiating the ion extraction pulses. The system clock/timing circuit 104 controls the time of flight trigger 102 to provide a means by which the operation of the mass mapped acquisition and the mass defect detection circuit 100 can be synchronized to the ion source extraction pulse.

In operation, the capture circuits 80 and 82 are made operational alternately just prior to the expected arrival times of ions having even and odd numbered mass-to-charge ratios. While the capture circuit 80 is detecting the intensity of ions having an odd number mass-to-charge ratio, capture circuit 82 is turned off. Subsequently, capture circuit 80 is turned off and capture circuit 82 becomes operational just prior to the expected arrival time of a group of ions having an even number mass-to-charge ratio. While capture circuit 82 is operational, the information generated by capture circuit 80 is processed by components 84, 86 and 88 and transmitted to the output FIFO buffer 96. Subsequently, the capture circuit 80 will again be turned on just prior to the expected arrival time of the group of ions having the next odd number mass-to-charge ratio. While capture circuit 80 is operational, the information generated by capture circuit 82 is processed by components 90, 92 and 94 and transmitted to the output FIFO buffer 96. This dual capture approach provides adequate timing for even the high-mass range where the ion peaks are in closest proximity to each other. The use of two input FIFO buffers 86 and 92 maximizes system throughput because while one buffer is being filled, the other is being read out by its associated digital signal processor. The asynchronous nature of the sequential operations of loading the input FIFO buffers 86 and 92, and the unloading and processing by the digital signal processors 88 and 94, enables continuous operation of the apparatus 78 for very long periods of time without loss of data. While many heretofore developed data systems are only able to obtain one to two scans per second, the apparatus 78 can yield 50–200 or more scan files per second.

In applications where even greater resolution is desired or a smaller mass range is covered within the data collection window, the apparatus 78 readily enables modular expansion of additional capture circuits to facilitate same. For example, an alternative embodiment of the apparatus of FIG. 5 could be readily constructed which incorporates an even larger plurality of capture circuits sufficient to enable the collection of, for example, 10 or more points across each and every ion peak within a transient. Driven by suitable delta-mass tables, this configuration would yield a mass axis resolution analogous to that of the quadrupole or single focusing magnetic sector mass spectrometers. The fractional mass dependent data obtained by this apparatus and technique could then be subjected to centroiding or other mathematical processing to gain fractional mass resolution sufficient for applications such as electrospray mass spectrometry where ions having multiple charges are encountered. Additionally, if narrow peak data collection windows are used, real time profiles of the mass spectra may be produced with this mode of operation.

Figure 6:
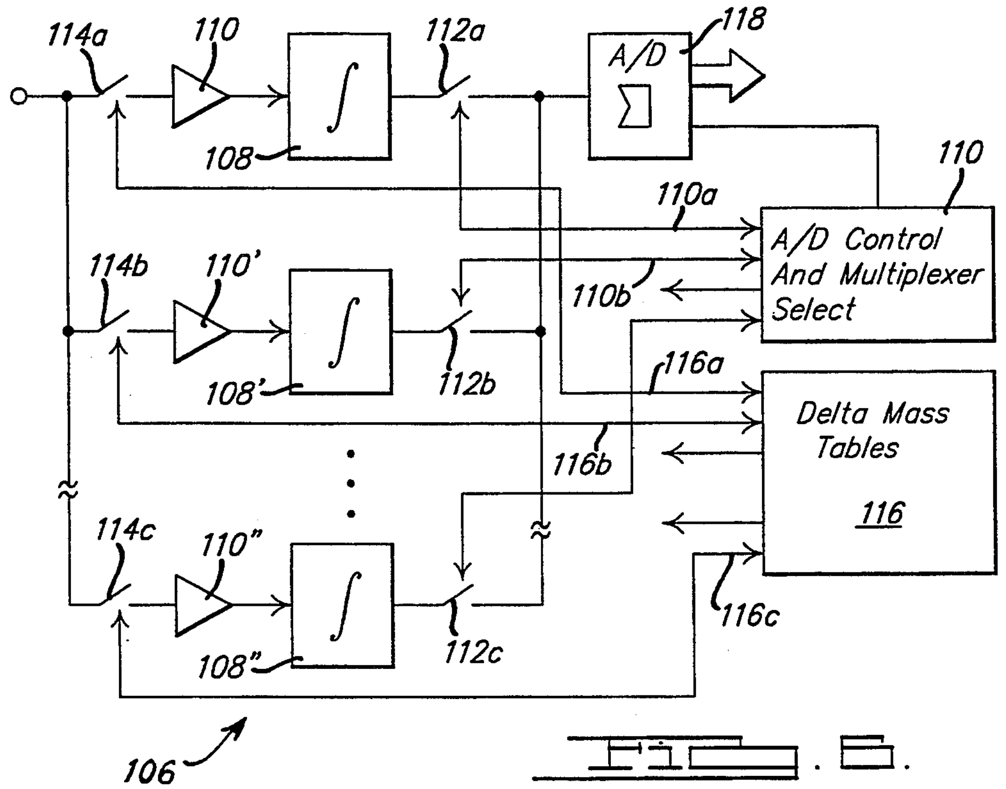
FIG. 6 is a block diagram of an alternative preferred embodiment of the present invention illustrating a plurality of independent integrator circuits for summation of a plurality of m/z ion peaks from sequential ion source extractions through analog manipulation thereof.

Referring now to FIG. 6, there is shown yet another integrating transient recorder apparatus 106 in accordance with another alternative preferred embodiment of the present invention. The apparatus 106 operates in analog fashion to sum (i.e., integrate) ions having similar mass-to-charge ratios for succeeding incoming transients. The apparatus 106 is preferably used whenever ions having a limited number of different mass-to-charge ratios are desired to be measured, rather than the continuous mass spectrum.

The apparatus 106 consists of a plurality of boxcar integrators 108, 108' and 108". It will be understood immediately, however, that a greater or lesser number of integrators 108 could be used to suit the needs of specific applications and that the illustration of three boxcar integrators has been shown merely to illustrate that a plurality of integrators can be controlled sequentially to provide analog summing of similar mass-to-charge ratio ions.

The apparatus 106 further includes amplifiers 110, 110' and 110" for each integrator 108, 108' and 108", respectively. Each integrator 108, 108' and 108" is further coupled to an analog-to-digital control and multiplexer select circuit 110 through control lines **110*a*, 110*b* and 110*c* which controls switches 112*a*, 112*b* and 112*c*, respectively. A second plurality of switches 114*a*, 114*b* and 114*c* are further controlled via lines 116*a*, 116*b* and 116*c*, respectively, by the delta-mass tables circuitry 116** enabling the boxcar integration timing function.

In operation, each boxcar integrator 108, 108' and 108" is turned on by a signal from its corresponding control line **116*a*, 116*b*, 116*c* at an appropriate time in accordance with a predetermined time delay value from the delta-mass tables 116, which controls the opening and closing of switches 114*a*, 114*b* and 114*c*. Accordingly, each boxcar integrator 108, 108', 108" only receives ions having a predetermined mass-to-charge ratio. Each of the boxcar integrators 108, 108' , 108" are further controlled by the multiplexer select circuit 110, which causes the output of each integrator 108, 108', 108" to be transmitted to an A/D converter 118 by controlling the opening and closing of the appropriate switch 112*a*, 112*b*, 112*c***.

Ions having a first expected time of arrival (i.e., a first mass-to-charge ratio) are input to the integrator 108 by closing switch **114*a* shortly before their expected time of arrival. The same mass-to-charge ion packet from successive transients are introduced into the integrator by the boxcar action for a preset number of transients and for a preset amount of time. The integrated signal generated by integrator 108 is then output to the A/D 118 by closing the switch 112*a*. At this time switches 114*b*, 114*c* and 112*b*, 112*c*** are all open.

Prior to the anticipated arrival time of the next selected m/z ions, switches **114*a* and 114*c* are opened while switch 114*b* is closed by the signal on line 116*b*. The ions in successive transients arriving at the second anticipated arrival time are input to the integrator 108' again over the preset number of transients and the integrated output thereof is transmitted to the A/D converter 118 when switch 112*b* is closed. Prior to the anticipated arrival time of the third group of ions, switches 114*a*, 114*b* and 112*a*, 112*b* and 112*c* are open and switch 114*c* is closed by the appropriate signal on line 116*c***.

Ions arriving at the third anticipated time of arrival are integrated by the boxcar integrator 108" again over the preset interval of successive transients and transmitted to the A/D converter 118 through the subsequent closure of switch **112*c***. Accordingly, as succeeding transients progress, the analog signals being captured for each selected group of ions are integrated or summed, providing an output that is the sum of the multiple input analog ion peaks. Since the masses to be measured are preselected, the results of digitization will furnish the information for the generation of a partial mass spectrum consisting only of the ions having the selected mass-to-charge ratios. From this point, this partial mass spectrum will be processed in a manner analogous to the other preferred embodiments described herein.

Figure 7:
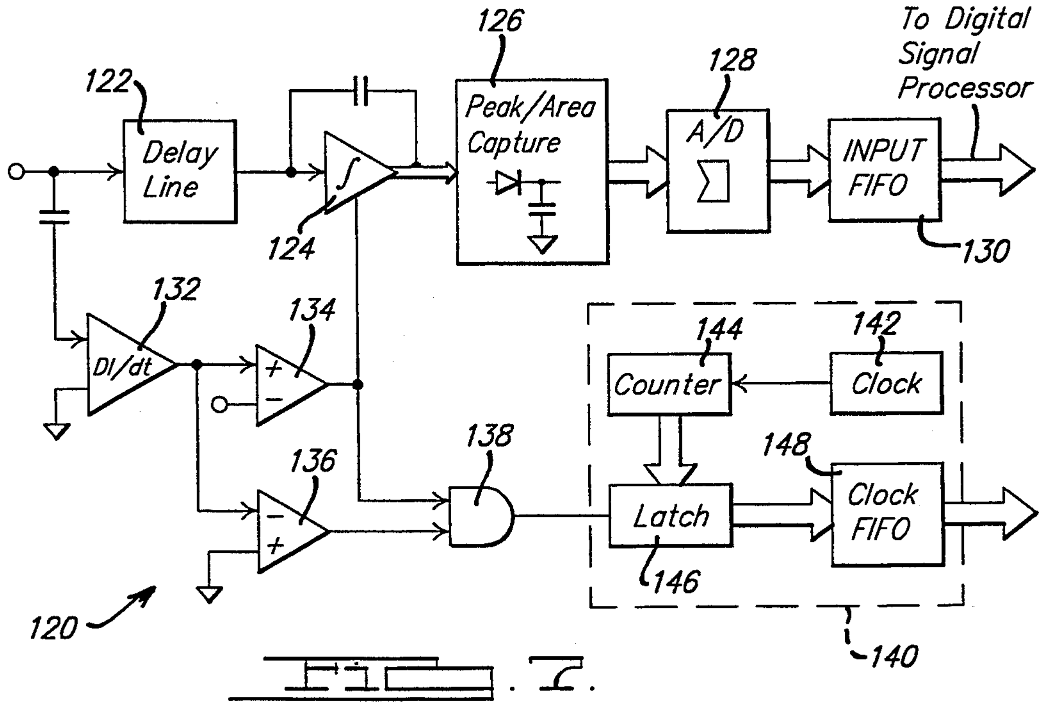
FIG. 7 is a block diagram of an alternative preferred embodiment of the present invention utilizing signal threshold and zero crossing detectors for initiating the measurement of ion intensity levels and concurrently the time of arrival of ions not having predetermined mass-to-charge ratios.

Referring now to FIG. 7, an "Ad Lib" transient recorder 120 is shown in connection with another alternative embodiment of the present invention. With this apparatus, the data collection window is initiated by detection of the incoming ion peak, in contrast to the other preferred embodiments described herein which initiate the data collection window in accordance with predetermined time delays from the delta-mass tables.

The apparatus 120 generally comprises a time delay circuit 122, an integrator 124 or an optional peak capture circuit 126, an A/D converter 128 and an input FIFO buffer 130. An incoming transient is further directed to a differentiator 132 which provides signals representative of the instantaneous rate of change of each of the ion peaks being received. The output of the differentiator 132 is input simultaneously into a threshold detector 134 and a zero crossing detector 136. The outputs of the detectors 134 and 136 are gated via an AND-gate 138 to a timing circuit 140. The timing circuit 140 includes a clock 142 for generating a clock pulse applied to a digital counter 144. A latch 146 is responsive to the output of the AND-gate 138 and operates to latch the count in the counter 144 upon receipt of a signal from the AND-gate 138. The clock FIFO buffer 148 temporarily stores the output of the latch 146 before the information is read to an external digital signal processor.

In operation, the incoming ion peaks are received by the differentiator 132 and the delay circuit 122 simultaneously. The delay circuit 122 delays the incoming ion peak signal to account for fixed, predetermined delays introduced by the differentiating, threshold sensing and zero crossing circuitry (132, 134, 136). Thus before being received by the integrator 124, the differentiated output signal of the differentiator 132 is supplied to the threshold detector 134 and the zero crossing detector 136. When the ion peak exceeds a predetermined threshold signal applied to the comparator 134, the comparator 134 initiates operation of the data collection processes in a manner exactly similar to those of the prior described embodiments in an action analogous to that of the delta-mass tables 124. The delay time 122 allows the decision to measure an incoming ion peak to be made prior to the appearance of the signal at the input of the measuring circuitry 124. The ion extraction pulse also simultaneously initiates operation of the clock 142, which begins applying a clock signal to the counter 144, which in turn begins accumulating a count indicative of the time lapse since the ion source extraction pulse was applied.

The zero crossing detector 136 detects when the slope of each ion peak has crossed zero to thus provide an exact measurement of the center of each incoming ion peak. At each such instant the zero crossing detector 136 provides an output signal to an input of the AND-gate 138 indicative of same. At the instant that the AND-gate receives signals from both sources 134 and 136 it generates an output signal which triggers the latch 146. When the latch is triggered it "latches" the count of the counter 144 at that instant and transmits the latched count to the clock FIFO buffer 148. The latched count indicates the precise arrival time of each incoming ion peak. After the integrator 124 or optional peak capture circuit 126 is turned on, the ion peak will then be integrated by the integrator 124 or the peak ion intensity determined by the peak capture circuit 126 before being transmitted to the A/D converter 128. The A/D converter 128 provides a digital representation of the analog output of the integrator 124 (or the peak capture circuit 126) and temporarily stores this output in the input FIFO buffer 130. Likewise, the counter will be latched by the latch 146 when the threshold detector 134 and zero crossing detector 136 concurrently provide signals to the AND-gate 138. Thus, the clock FIFO 148 will contain a digital value (preferably at least a 16 bit digital word) representative of the time of arrival of the ion being detected.

With the apparatus 120 of FIG. 7, the measured times read out from the clock FIFO buffer 148 will preferably be converted into mass-to-charge values subsequent to the spectrum generation. It is expected that this embodiment will be used whenever the mass range to be scanned is very great and, secondly, when ions of charge greater than one are encountered. Such ions present themselves as non-nominal masses which cannot be calculated prior to data collection as can be done when a charge on the ion is equal to one.

The apparatus 120 of FIG. 7 may further be operated in two modes. In the first mode, in which nominal mass resolution is desired, the summing of the individual ion peaks from subsequent transients will be made using peak time clock values which are created by ignoring the last three significant bits of the digital signal from the clock FIFO buffer 148. This enables high speed time array detection. A second operational mode is utilized when ions with a charge greater than one are encountered. In this situation, each cluster of arrival times of individual ions from successive transients will be averaged to yield a final 16 bit value for the arrival time of the ions in that particular group. This value will subsequently be translated into an exact mass (plus or minus 0.1 amu) which, in combination with other exact masses obtained from the same molecular fragment with different charges, is used in subsequent mathematical correlation programs to calculate the actual mass and charge of the ion being measured under the conditions of multiple charge. In the Ad-Lib mode the apparatus 120 utilizes all of the features of the previous embodiments described herein with the exception of substituting for the predetermination of arrival times the concept of peak detection as the controlling determinant of the beginning point of the data collection window and the data collection process. In situations where a limited mass range is to be examined, the clock storage feature of the Ad Lib embodiment 120 of FIG. 7 can be implemented using the hardware of the embodiments of FIGS. 1, 5 and 6 and the utility of the FIFO buffer expanded by automatically incrementing the FIFO buffer address as a continuous "event clock" with the buffer storing the intensity value in a buffer location appropriate to the time of arrival of the measured ion transient.

Figure 8:
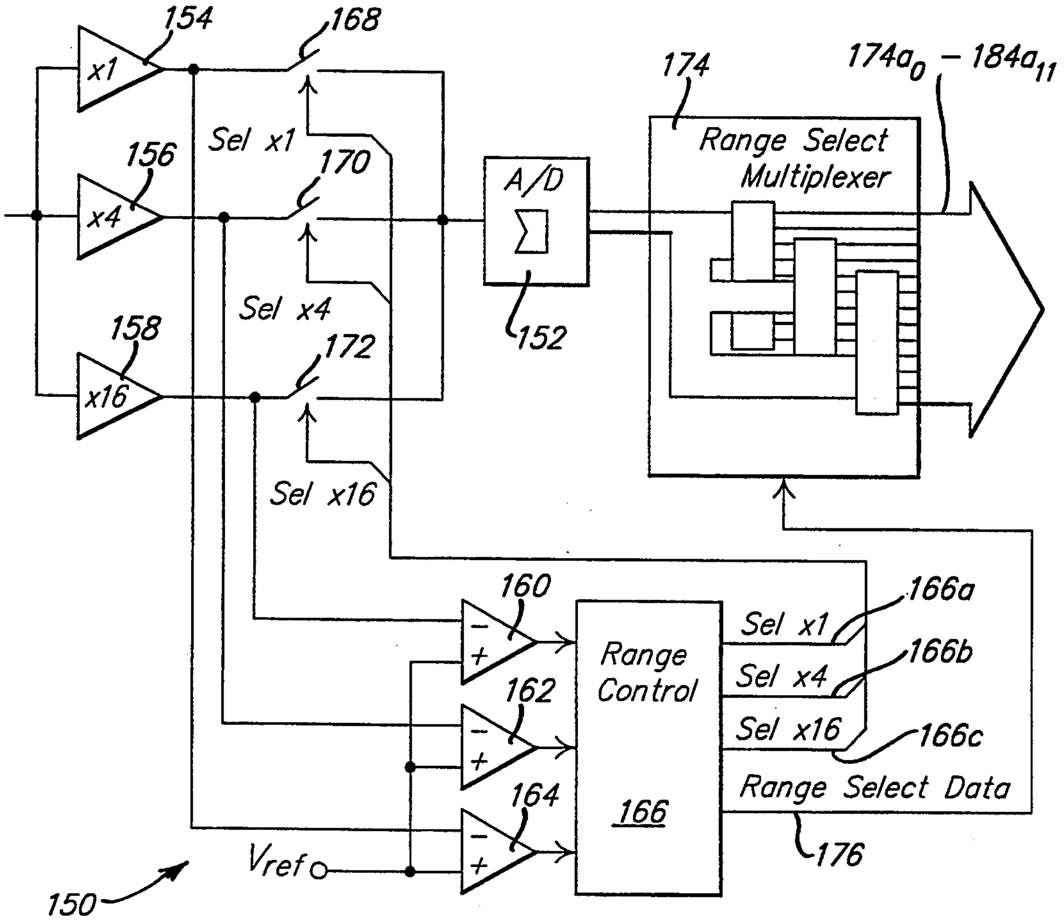
FIG. 8 is a block diagram of an apparatus for increasing the range of measurement of the analog-to-digital converters of the preferred embodiments of FIGS. 1–7, automatically accordance with the output from the analog-to-digital converter with which it is used.

Referring now to FIG. 8, there is shown an apparatus circuit 150 for increasing the range of measurement of a standard A/D converter such as that used in the preferred embodiments disclosed herein. The apparatus 150 automatically expands the range of measurement capability of a standard A/D converter depending on the magnitude of the gain of the analog input to the A/D converter.

The apparatus 150 generally includes a first amplifier 154 having a unity gain, a second amplifier 156 having a gain of four and a third amplifier 158 having a gain of sixteen. Outputs from each of the amplifiers 156–158 are output independently to an associated comparator 160, 162 and 164. Outputs of the comparators 160-164 are input into a range control circuit 166. The range control circuit 166 has three control outputs **166*a*, 166*b* and 166*c* which each control independent switches 168, 170 and 172 in series with the outputs of the amplifiers 154–158. Selective closing of one of the switches 168–172 couples its associated amplifier output with the A/D converter 152**.

The output of the A/D converter (for example, an 8-bit analog-to-digital converter) 152 is input into a range select gating circuit 174 having, for example, a 12-bit output **174*a*. A range select data output 176 from the range control circuit 166 is input to the range select gate 174 for controlling which of bits 0–11 of the 12-bit output word are coupled to the output of the A/D converter 152**.

In operation, each ion peak in the incoming transient is amplified by each one of the amplifiers 154, 156 and 158 and a comparison made between each amplified ion peak and a reference signal on the non-inverting input of each one of the comparators 160, 162 and 164. For example, when the first incoming ion peak has a magnitude, after being amplified by amplifier 158 that is not sufficient to exceed the reference signal on the non-inverting input of comparator 160, the range control circuit 166 outputs a signal on control line 166c which causes switch 172 to remain closed. Closure of switch 172 couples the output of the highest gain amplifier 158 to the input of the analog-to-digital converter 152 while switches 168 and 170 remain open. Thus, the A/D converter 152 receives the first incoming ion peak which has been increased in gain by a factor of 16. The A/D converter 152 generates an 8-bit digital output representative of the analog input it receives. This output is caused to be coupled to outputs $174a_0$–$174a_7$ by a signal from the range control circuit 166 on range select data control line 176. Accordingly, an 8-bit digital word is generated from the 8 bit output of the A/D converter 152.

Subsequently, if an incoming ion peak is received which has a magnitude, after being amplified by the amplifiers 154–158, sufficient to exceed the reference signal of comparator 160 but not that of comparator 162, the range control circuit 166 generates a control signal on control line **166*b*. The signal on control line 166*b* closes the switch 170, thus coupling the output of amplifier 156 to the input of the A/D converter 152. The 8-bit output of the A/D converter 152 is then coupled to outputs $174a_2$–$174a_9$ of the range select multiplexer 174 via an appropriate control signal on range select data line 176. Thus, in effect, a 10 bit word is generated in which bits 0–1** will be zero.

When the incoming ion peak, after being amplified by the amplifiers 154–158, has a magnitude sufficient to overcome the threshold signal of comparator 162, the range control circuit 166 transmits a control output on control line **166*a***. The control signal on control line 166a causes the switch 168 to close, thus coupling the output of the amplifier 154 to the input of the A/D converter 152. The 8-bit output of the A/D converter 152 is then coupled to outputs $174a_4$–$174a_{11}$ creating a 12 bit output word. Thus, depending on the magnitude of the incoming transient, the range of measurement will be increased or decreased automatically by providing an output from the range select gate 174 having a varying bit displacement. Thus, the apparatus 150 provides increased measurement capability without the need for additional software or complicated timing circuitry, and also without sacrificing precision of the A/D converter 152 while gaining a higher output range.

Figure 9:
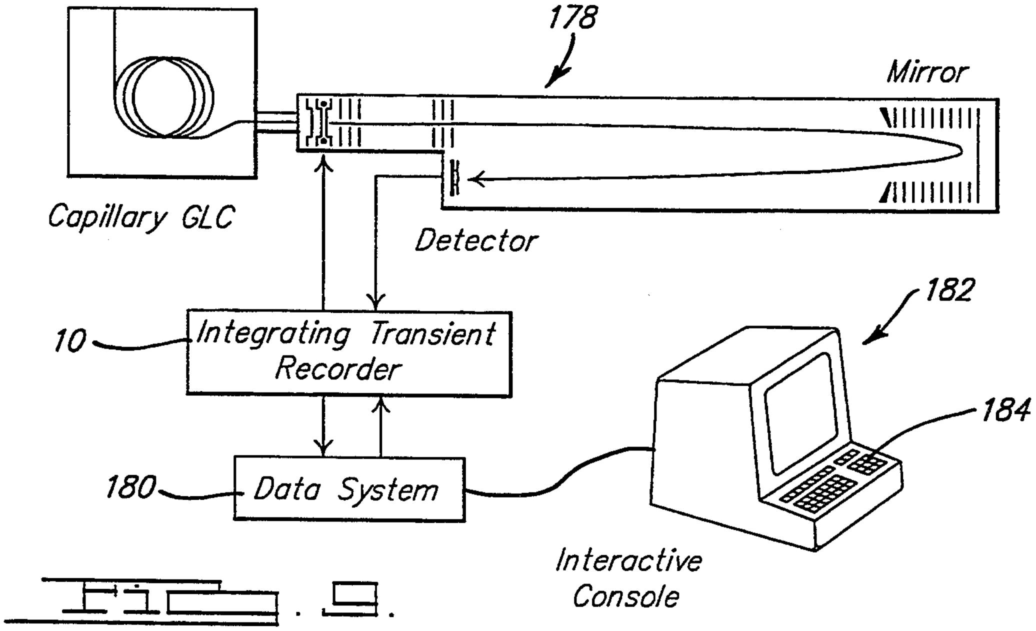
FIG. 9 is a block diagram of a system in which the apparatus of the present invention may be used.

Referring now to FIG. 9, the apparatus 10 of the present invention is shown in simplified block diagram form in combination with a mass spectrometer 178, a data handling system 180, and a computer system 182 having an interactive console 184. The control functions, instrumental parameters and data collection parameters are entered by the operator into the computer 182 via the console 184. This information is passed to the apparatus 10 where the actual control of the data timing, data collection, data summation and data transfer processes occur.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. Apparatus for detecting a plurality of ion peaks within at least one transient in time of flight mass spectrometry, said transient being generated in response to an ion source extraction pulse, said apparatus comprising:

signal detector means responsive to said ion peaks for detecting each of said ion peaks and generating an output signal indicative of the intensity of each of said ion peaks;

means for turning on said signal detector means only for a data collection time window beginning just prior to an expected arrival time of each said ion peak; and means for processing said ion peaks to generate a mass spectrum file indicative of intensities of said ion peaks.

2. The apparatus of claim 1, further comprising mass defect detector means for monitoring an actual arrival time for each said ion peak at said signal detector means and causing said data collection time window to be shifted in accordance with said actual arrival time of each said ion peak such that each said ion peak falls within an approximate center of said data collection time window.

3. The apparatus of claim 2, wherein said mass defect detector means comprises a plurality of delta-mass tables, each said table containing a plurality of time delay values for causing said signal detector means to be turned on at times slightly prior to said expected time of arrival of each said ion peak depending on a mass defect of said ion peak, to thereby cause each said data collection time window to be shifted such that each said ion peak falls completely within one of said data collection time windows.

4. The apparatus of claim 2, wherein said means for processing said ion peaks comprises means for successively summing said ion peaks of successive transients having similar mass-to-charge ratios; and means for storing said summed ion peaks having similar mass-to-charge ratios in a time locked registry to create a mass spectrum file.

5. The apparatus of claim 1, wherein said signal detector means comprises a capture circuit for detecting each said ion peak and generating digital signals representative of the intensity of each said ion peak.

6. The apparatus of claim 1, wherein said signal detector means comprises a capture circuit for detecting each said ion peak and generating analog signals representative of the intensity of each said ion peak.

7. The apparatus of claim 1, wherein said means for processing said ion peaks comprises means for analog summing of ion peaks having similar mass-to-charge ratios of successive transients and generating an analog signal in accordance with a summed intensity of said ion peaks having similar mass-to-charge ratios.

8. The apparatus of claim 1, wherein said means for processing said ion peaks comprises means for digitally summing ion peaks having similar mass-to-charge ratios of successive transients and generating a digital signal in accordance with a digitally summed intensity of said ion peaks having said similar mass-to-charge ratios.

9. Apparatus for detecting a plurality of ion peaks within at least one transient in time of flight mass spectrometry, said transient being generated in response to an ion source extraction pulse, said apparatus comprising:

capture circuit means responsive to said ion peaks for detecting each of said ion peaks in real time and generating an output signal indicative of the intensities of said ion peaks where each said ion peak has a predetermined mass-to-charge relationship;

means for turning on said capture circuit means just prior to a predetermined time of arrival of each said ion peak at said capture circuit means, and for maintaining said capture circuit means turned on only for a predetermined data collection time window thereafter such that said capture circuit means is generating said output signals only at times during which said ion peaks are expected to be arriving at said capture circuit means;

analog-to-digital conversion means responsive to said output signals of said capture circuit means for providing a digital output in accordance with said output signals of said capture circuit means, said digital output comprising digital representations of the intensities of each said ion peak;

a first input FIFO buffer responsive to said digital output of said analog-to-digital converter means for temporarily storing said digital output of said analog-to-digital converter means;

a second input FIFO buffer responsive to said analog-to-digital converter means for temporarily storing digital said output of said analog-to-digital converter means;

digital signal processing means responsive to said first input FIFO buffer and said second input FIFO buffer for reading out and processing first digital signals from said first input FIFO while said digital output of said analog to digital conversion means is being loaded into said second input FIFO buffer, for reading out and processing second digital signals from said second input FIFO buffer while said digital output of said analog-to-digital conversion means is being loaded into said first input FIFO buffer, and for successively summing selected ones of said first and second digital signals which are representative of similar mass-to-charge ratios in a time locked registry to generate a mass spectrum file.

10. The apparatus of claim 9, wherein said capture circuit means comprises circuit means for detecting the peak of each said ion peak within each said transient.

11. The apparatus of claim 9, wherein said capture circuit means comprises circuit means for integrating each of said ion peaks.

12. The apparatus of claim 9, wherein said means for turning on said capture circuit means comprises means for storing a plurality of predetermined time delay intervals, each said interval being associated with an expected time of arrival of a particular one of said ion peaks having a particular mass-to-charge ratio to thereby cause said capture circuit means to be turned on just prior to said predetermined time of arrival of said particular ion peak.

13. The apparatus of claim 12, further comprising mass defect detector means for monitoring the arrival of said ion peaks at said capture circuit means and for shifting said predetermined time window to cause each said ion peak to fall within an approximate midpoint of said window, to thereby compensate for variations in actual arrival times of said ion peaks caused by mass defects.

14. The apparatus of claim 9, further comprising an output FIFO buffer responsive to said output of said digital signal processing means for temporarily storing a mass spectrum file generated by said digital signal processing means.

15. The apparatus of claim 9, further comprising means for automatically increasing the range of measurement of said analog-to-digital conversion means in response to the magnitude of each one of said ion peaks.

16. The apparatus of claim 15, wherein said means for increasing the range of measurement comprises:

a plurality of independent amplifiers each having a different gain and being responsive to said ion peaks;

a plurality of comparators each responsive to a common predetermined reference threshold signal and an output of an associated one of said amplifiers;

a range control circuit responsive to an output of said comparators for producing a corresponding plurality of switch control signals and a range select signal dependent on an intensity of each said ion peak;

a plurality of switches each associated with an output of a single one of said amplifiers and responsive to said switch control signals, said switches each coupling a selected one of said amplifier outputs to said analog-to-digital conversion means in response to a particular one of said switch control signals; and range select multiplexer means for receiving an output from said analog-to-digital conversion means and said range select signal and generating in response thereto a corresponding digital word having a greater bit length than said output of said analog-to-digital conversion means.

17. Apparatus for detecting a plurality of ion peaks within at least one transient in time of flight mass spectrometry, said transient being generated in response to an ion source extraction pulse, said apparatus comprising:

capture circuit means responsive to said ion peaks for providing a series of analog output signals relating to the intensity of each said ion peak;

means for turning on said capture circuit means at at least one predetermined time during the arrival at said first capture circuit means of each said ion peak within said transient, and for maintaining said capture circuit means turned only for a predetermined time window sufficient to completely capture at least a portion of each said ion peak;

mass defect detector means for monitoring said arrival of said ion peaks at said capture circuit means and for shifting said window in time to compensate for variations in the actual arrival times of said ion peaks caused by mass defects such that said ion peaks are received at approximately a midpoint of each said window;

analog-to-digital converter means responsive to analog output signals from said capture circuit means for generating a corresponding series of digital signals representative of the intensities of said ion peaks;

a first input FIFO buffer responsive to said digital signals of said analog-to-digital converter means during a first received one of said transients for temporarily storing said digital signals therein;

a second input FIFO buffer responsive to said digital signals of said analog-to-digital converter means for temporarily storing said digital signals therein;

digital signal processing means responsive to both said first input FIFO buffer and said second input FIFO buffer for reading out said first input FIFO buffer while said second input FIFO buffer is being loaded with said digital signals, and for reading out said second input FIFO buffer while said first input FIFO buffer is being loaded with said digital signals, and for generating a mass spectrum file indicative of the intensities of all of said ion peaks.

18. The apparatus of claim 17, wherein said mass defect detector means comprises a plurality of delta/-mass tables including a plurality of time delay values, said time delay values being such as to cause said capture circuit means to be turned on prior to said predetermined times of arrival when said ion peaks consistently occur in the first half of said predetermined time window, or to cause said capture circuit means to be turned on subsequent to said predetermined times of arrival when said ion peaks consistently occur in the second half of said predetermined time window.

19. The apparatus of claim 17, wherein said output from said capture circuit means represents an analog peak ion signals for ions present within said transient.

20. The apparatus of claim 17, wherein said output of said capture circuit means comprises an integration of each said ion peak.

21. The apparatus of claim 17, further comprising second capture circuit means responsive to said means for turning on said capture circuit means for generating a plurality of second analog output signals representative of intensities of at least selected portions of selected ones of said ion peaks.

22. The apparatus of claim 21, wherein said means for turning on said capture circuit means includes timing means for turning on said second capture circuit means and for controlling said capture circuit means and said second capture circuit means such that only one is turned on while said ion peaks having even numbered mass-to-charge ratios are arriving at said capture circuit means and second capture circuit means, and the other is only turned on while said ion peaks having odd-numbered mass-to-charge ratios are arriving at said capture circuit means and said and second capture circuit means.

23. The apparatus of claim 22, wherein said capture circuit means is turned on only at a first selected one of a plurality of predetermined times of arrival of said ion peaks to thereby capture only information relating to the intensity of ions having a first predetermined mass-to-charge ratio; and wherein said second capture means is turned on only at a selected second one of said plurality of predetermined times of arrival of said ion peaks to thereby capture only information relating to the intensity of ions having a second predetermined mass-to-charge ratio.

24. The apparatus of claim 21, further comprising second analog-to-digital converter means responsive to said second capture circuit means for providing digital signals representative of said second analog output signals of said second capture circuit means.

25. Apparatus for detecting a limited number of ion peaks within at least one transient in time of flight mass spectrometry, said apparatus comprising:

integrator means responsive to said ion peaks for integrating said ion peaks within said transient to generate a plurality of integrated output signals representative of the intensity of each said ion peak;

means for turning on said integrator means only at expected times of arrival of said ion peaks, and only for a predetermined time window during each of said expected times of arrival sufficient to capture at least a desired portion of said ion peaks; and analog-to-digital converter means responsive to said output signals from said integrator means for generating digital output signals in response thereto representative of said integrated output signals.

26. The apparatus of claim 25, further comprising:

second integrator means responsive to said ion peaks for summing selected ones of said ion peaks having selected mass-to-charge ratios to provide a plurality of second integrated output signals representative of the intensity of each of said selected ones of said ion peaks; and multiplexer control means for controllably causing said outputs of said integrator means and said second integrator means to be coupled to said analog-to-digital converter means and for initiating operation of said analog-to-digital converter means such that said analog-to-digital converter means successively converts initially said integrated output signals from said integrator means and then said second integrated output signals from said second integrator means into said digital output signals and said second digital output signals, respectively.

27. A method for performing time array detection in time of flight mass spectrometry wherein information on each ion peak within each transient is collected by a detector only at expected times of arrival of each said ion peak, said method comprising the steps of:

a. determining a time of arrival for each said ion peak; and b. turning on a detector for receiving said ion peaks just prior to said determined time of arrival of each one of said ion peaks and only for a predetermined data collection time window sufficient to allow each one of said ion peaks to be detected, in real time, by said detector, and generating a series of analog output signals from said detector representative of the intensities of said ion peaks.

28. The method of claim 27, further comprising the steps of:

c. generating a plurality of digital signals representative of said series of analog output signals;

d. storing said digital signals in an input FIFO buffer; and e. processing said digital signals to generate an information file that embodies the activity of said detector for said transient.

29. The method of claim 28, further comprising the steps of:

repeating steps b through e for a second, successive transient; and summing said digital signals representative of said ion peaks having similar mass-to-charge ratios in a mass mapped registry to produce a mass spectrum scan file.

30. The method of claim 27, further comprising the steps of:

monitoring the arrival of each said ion peak at said detector to determine an actual time of arrival of each said ion peak within said transient;

when said actual arrival times vary from said expected arrival times, accessing a delta/mass table to obtain time delay correction values to be applied in turning on said detector so as to shift said predetermined data collection time window to cause each of said ion peaks to be received completely within said predetermined data collection time window.

31. The method of claim 30, wherein certain of said time delay correction values cause said detector to be turned on prior to the determined times of arrival of said ion peaks when said ion peaks consistently occur in the first half of said time window; and wherein certain other of said time delay correction values cause said detector to be turned on subsequent to said determined times of arrival of said ion peaks when said ion peaks consistently occur in the second half of said time window.

* * * * *

UNITED STATES PATENT AND TRADEMARK OFFICE

CERTIFICATE OF CORRECTION

PATENT NO. : 5,367,162

DATED : November 22, 1994

INVENTOR(S) : Holland et al

It is certified that error appears in the above-indentified patent and that said Letters Patent is hereby corrected as shown below:

ON THE TITLE PAGE, under "U.S. Patent Documents", reference 4,970,390, "Szymezak" should be --Szymczak--.

ON THE TITLE PAGE, under "U.S. Patent Documents", last reference, "5,175,470" should be --5,175,430--.

Column 2, line 24, after "order" insert --to--.

Column 8, line 60, after "automatically" insert --in--.

Column 9, line 8, after "coupled" insert --in--.

Column 9, line 45, delete "25".

Column 13, line 30, "successive spectra," should be --successive spectra,--.

UNITED STATES PATENT AND TRADEMARK OFFICE

CERTIFICATE OF CORRECTION

PATENT NO. : 5,367,162

DATED : November 22, 1994

INVENTOR(S) : Holland et al

It is certified that error appears in the above-indentified patent and that said Letters Patent is hereby corrected as shown below:

Column 13, line 60, "1 ns-20 ns" should be --1ns-20ns--.

Column 14, line 66, "2" should be --62--.

Column 22, line 61, claim 9, (first occurrence), delete "said"

Signed and Sealed this

Sixteenth Day of May, 1995

*Attest:*

BRUCE LEHMAN

*Attesting Officer*

*Commissioner of Patents and Trademarks*